No. 852,939. PATENTED MAY 7, 1907.
F. E. FAIRMAN.
REVERSING GEAR.
APPLICATION FILED MAY 18, 1906.
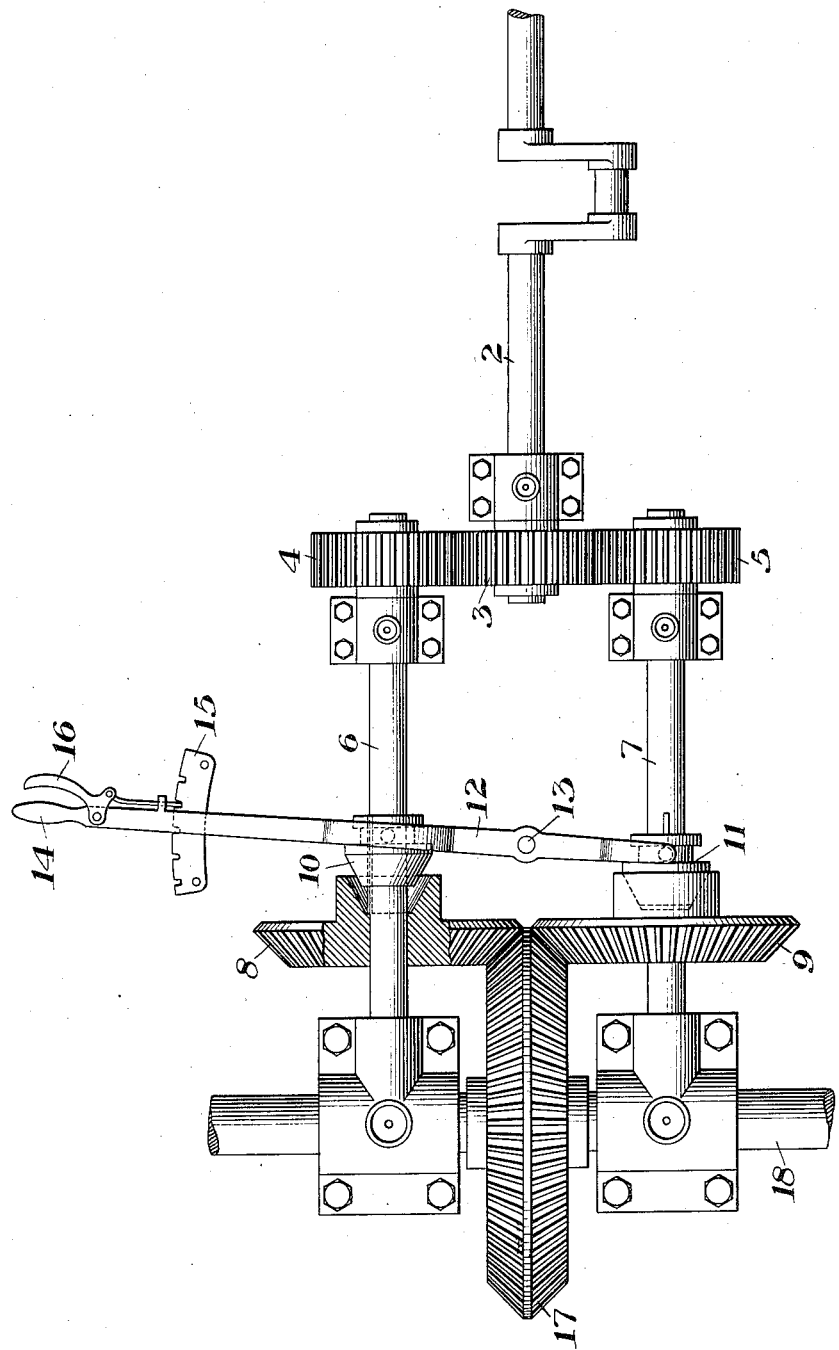
WITNESSES
Warren W. Swartz
R. A. Balderson
INVENTOR
Francis E. Fairman

UNITED STATES PATENT OFFICE.

FRANCIS E. FAIRMAN, OF ALLEGHENY, PENNSYLVANIA.

REVERSING-GEAR.

No. 852,939.　　　Specification of Letters Patent.　　　Patented May 7, 1907.

Application filed May 18, 1906. Serial No. 317,497.

*To all whom it may concern:*

Be it known that I, FRANCIS E. FAIRMAN, of Allegheny, Allegheny county, Pennsylvania, have invented a new and useful Reversing-Gear, of which the following is a full, clear, and exact description, reference being had to the accompanying drawings, forming part of this specification, in which the figure is a diagrammatic plan view showing one form of my improved gear.

My invention relates to apparatus for reversing the direction of rotation of a driven shaft, while continuously rotating the driving shaft in the same direction.

The object of the invention is to provide a cheap and effective system for this purpose in which it is not necessary to move gears into and out of mesh, or to reverse the direction of rotation of the driving shaft.

In the drawings, 2 represents the driving shaft which is provided with a toothed wheel intermeshing with opposite toothed wheels 4 and 5. The gears 4 and 5 are mounted on parallel shafts 6 and 7 on which the bevel wheels 8 and 9 are loosely mounted. On each of the shafts 6 and 7 are provided clutch devices 10 and 11 which are shown as actuated by the common lever 12 fulcrumed at 13 and having the handle 14. I have shown a toothed segment 15 with a snap handle 16 by which the lever may be held in adjusted position. With this arrangement one clutch will be released when the other clutch is thrown in, so that one bevel wheel will be connected to its shaft while the other is running idly thereon. The bevel wheels 8 and 9 intermesh with a double bevel wheel 17 secured to the driven shaft 18. I have shown this wheel as in one piece with bevel teeth on opposite sides, though it may be made in the form of two separate bevel wheels.

In using the device all the gear wheels rotate continuously, the shafts 6 and 7 rotating in opposite directions. Power will be transmitted through one of these shafts to which the bevel wheel is clutched, while the other parallel intermediate shaft will be driven idly. To reverse the direction of rotation of the driven shaft it is only necessary to swing the clutch lever which will release the bevel wheel clutched to its shaft, and connect the loose bevel wheel to its shaft, thus reversing the application of power.

The advantages of my invention result from the simplicity of the system and the reversal of the driven shaft without throwing gears into and out of mesh. The shaft 18 may be the driving shaft, the shaft 2 then becoming the driven shaft. The two sets of teeth on the shaft 18 may be formed as separate wheels, separate levers may be used for the clutches, and many other variations may be made in the form and arrangement of the parts without departing from my invention.

I claim:—

1. In a transmission gear, a pair of main shafts, one being a driving shaft and the other a driven shaft, two sets of bevel gear teeth carried on one of said shafts, and a spur gear carried on the other of said shafts, a pair of intermediate shafts, bevel gears loosely mounted on the intermediate shafts and intermeshing with the two sets of bevel gear teeth on one of the main shafts, mechanism for connecting said gears with or disconnecting them from the said intermediate shafts, and spur gears carried on said intermediate shafts and intermeshing with the spur gear on one of the main shafts; substantially as described.

2. In a transmission gear, a driving shaft, a spur wheel secured thereto, a driven shaft extending at right angles to the driving shaft, two sets of bevel gear teeth secured thereto, two intermediate shafts extending parallel with each other and with the driving shaft, bevel gear wheels loosely mounted on the intermediate shafts and intermeshing with the two sets of gear teeth on the driven shaft, clutch mechanism arranged to alternately connect the bevel gear wheels with or disconnect them from the intermediate shafts, and spur gears on the intermediate shafts intermeshing with the spur gear on the driving shaft; substantially as described.

In testimony whereof, I have hereunto set my hand.

FRANCIS E. FAIRMAN.

Witnesses:
　JOHN MILLER,
　H. M. CORWIN.